United States Patent
Jagannati et al.

(10) Patent No.: US 12,160,475 B2
(45) Date of Patent: Dec. 3, 2024

(54) SECURE COMMUNICATIONS OF STORAGE TENANTS THAT SHARE A STORAGE CLUSTER SYSTEM

(71) Applicant: Cohesity, Inc., San Jose, CA (US)

(72) Inventors: Harsha Vardhan Jagannati, Fremont, CA (US); Anand Bhat, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/542,346

(22) Filed: Dec. 15, 2023

(65) Prior Publication Data
US 2024/0121301 A1 Apr. 11, 2024

Related U.S. Application Data

(63) Continuation of application No. 17/971,431, filed on Oct. 21, 2022, now Pat. No. 11,895,189, which is a
(Continued)

(51) Int. Cl.
*G06F 15/16* (2006.01)
*G06F 9/455* (2018.01)
(Continued)

(52) U.S. Cl.
CPC ...... *H04L 67/1097* (2013.01); *G06F 9/45558* (2013.01); *H04L 12/4641* (2013.01);
(Continued)

(58) Field of Classification Search
CPC ............. H04L 67/1097; H04L 12/4641; H04L 67/1017; H04L 69/22; G06F 9/45558; G06F 2009/45579; G06F 2009/45595
(Continued)

(56) References Cited

U.S. PATENT DOCUMENTS 8,464,335 B1* 6/2013 Sinha ............... G06F 21/51
   713/153
9,419,857 B1* 8/2016 Ryan ............... H04L 63/08
(Continued)

OTHER PUBLICATIONS

Prosecution History from U.S. Appl. No. 17/036,330, now issued U.S. Pat. No. 11,516,291, dated Jan. 4, 2021 through Aug. 22, 2022, 27 pp.
(Continued)

*Primary Examiner* — Hamza N Algibhah
(74) *Attorney, Agent, or Firm* — Shumaker & Sieffert, P.A.

(57) ABSTRACT

A response communication that includes one or more data packets is received at a broker associated with a storage node of a plurality of storage nodes via a virtual network associated with the plurality of storage nodes of a storage system. The one or more data packets are provided, via the virtual network associated with the storage nodes, to a tenant communication component associated with an intended destination. A connection between the broker and the tenant communication component associated with the intended destination is terminated. A new connection between the intended destination and the tenant communication component associated with the intended destination is established. The new connection is associated with a virtual network associated with a storage tenant. The one or more data packets are sent to the intended destination via the virtual network associated with the storage tenant.

20 Claims, 8 Drawing Sheets

Related U.S. Application Data continuation of application No. 17/036,330, filed on Sep. 29, 2020, now Pat. No. 11,516,291.

(51) Int. Cl.
| | |
|---|---|
| *G06F 9/54* | (2006.01) |
| *H04L 12/46* | (2006.01) |
| *H04L 29/06* | (2006.01) |
| *H04L 67/1017* | (2022.01) |
| *H04L 67/1097* | (2022.01) |
| *H04L 69/22* | (2022.01) |

(52) U.S. Cl.
CPC .......... *H04L 67/1017* (2013.01); *H04L 69/22* (2013.01); *G06F 2009/45579* (2013.01); *G06F 2009/45595* (2013.01)

(58) Field of Classification Search
USPC .......................................... 709/217
See application file for complete search history.

(56) References Cited

U.S. PATENT DOCUMENTS

| | | | |
|---|---|---|---|
| 9,495,194 B1* | 11/2016 | Twitchell, Jr. .......... G06F 3/067 |
| 9,860,214 B2* | 1/2018 | Bian .................. H04L 63/0272 |
| 10,243,834 B1* | 3/2019 | Shekhar ................. H04L 45/64 |
| 10,348,689 B2* | 7/2019 | Bian ..................... H04L 67/141 |
| 10,778,724 B1* | 9/2020 | Miriyala ............. H04L 63/0245 |
| 10,972,341 B2* | 4/2021 | Mudigonda ......... H04L 41/0897 |
| 11,159,389 B1* | 10/2021 | Miriyala ............... H04L 41/142 |
| 11,516,291 B2 | 11/2022 | Jagannati et al. |
| 11,895,189 B2 | 2/2024 | Jagannati et al. |
| 2004/0013119 A1* | 1/2004 | MeLampy .............. H04L 47/15 709/227 |
| 2013/0047151 A1* | 2/2013 | Sridharan ............ H04L 65/102 718/1 |
| 2013/0091261 A1* | 4/2013 | Barabash ........... H04L 41/5096 709/223 |
| 2014/0115325 A1* | 4/2014 | Detienne ............. H04L 63/0428 713/160 |
| 2014/0307744 A1* | 10/2014 | Dunbar ................... H04L 45/64 370/401 |
| 2015/0081863 A1* | 3/2015 | Garg ....................... H04L 41/00 709/223 |
| 2015/0195196 A1* | 7/2015 | Patel ................... H04L 61/4511 370/392 |
| 2017/0235509 A1* | 8/2017 | Chittenden ........... G06F 3/0643 711/163 |
| 2017/0310755 A1* | 10/2017 | Hoernes .............. H04L 41/0853 |
| 2017/0339070 A1* | 11/2017 | Chang .................. H04L 67/562 |
| 2019/0044838 A1* | 2/2019 | Yao ...................... H04L 43/0811 |
| 2019/0158541 A1* | 5/2019 | Miriyala ............... H04L 63/205 |
| 2019/0294464 A1* | 9/2019 | Twitchell, Jr. ...... H04L 67/1097 |
| 2019/0319873 A1* | 10/2019 | Shelar ..................... H04L 69/14 |
| 2020/0412598 A1* | 12/2020 | Rao ........................ H04L 47/24 |
| 2021/0042045 A1* | 2/2021 | Tatara .................... G06F 3/0653 |
| 2021/0109786 A1* | 4/2021 | Choudhary ........... G06F 9/5027 |
| 2021/0224091 A1* | 7/2021 | Hayatnagarkar ..... G06F 16/955 |
| 2021/0390003 A1* | 12/2021 | Aghajanyan ............ H04L 67/10 |

OTHER PUBLICATIONS

Prosecution History from U.S. Appl. No. 17/971,431, now issued U.S. Pat. No. 11,895,189, dated Aug. 8, 2023 through Oct. 12, 2023, 27 pp.

* cited by examiner

300

```
┌─────────────────────────────────────┐
│ Communicate With A First Separate System │
│ Component Of A First Storage Tenant Using A │
│ First Set Of One Or More Tenant     │──── 302
│ Communication Components Via A First │
│ Virtual Network                     │
└─────────────────────────────────────┘
                  │
                  ▼
┌─────────────────────────────────────┐
│ Communicate With A Second Separate  │
│ System Component Of A Second Storage │
│ Tenant Using A Second Set Of One Or More │──── 304
│ Tenant Communication Components Via A │
│ Second Virtual Network              │
└─────────────────────────────────────┘
```

FIG. 3

SECURE COMMUNICATIONS OF STORAGE TENANTS THAT SHARE A STORAGE CLUSTER SYSTEM

CROSS REFERENCE TO OTHER APPLICATIONS

This application is a continuation of U.S. patent application Ser. No. 17/971,431 entitled SECURE COMMUNICATIONS OF STORAGE TENANTS THAT SHARE A STORAGE CLUSTER SYSTEM filed Oct. 21, 2022, which is a continuation of U.S. patent application Ser. No. 17/036,330, now U.S. Pat. No. 11,516,291, entitled SECURE COMMUNICATIONS OF STORAGE TENANTS THAT SHARE A STORAGE CLUSTER SYSTEM filed Sep. 29, 2020, each of which is incorporated herein by reference for all purposes.

BACKGROUND OF THE INVENTION

A datacenter may provide computing resources for a plurality of storage tenants. A storage tenant may correspond to a user, an individual, an enterprise, a government, a company, an organization, a department within an organization, etc. An entity associated with the datacenter may provision resources (e.g., storage space, computing resources, network bandwidth, etc.) for each of the storage tenants. A storage tenant may require its data to be stored separately from other tenants.

The datacenter may backup the data associated with each of the plurality of storage tenants (e.g., content data, metadata) to a storage system. A storage tenant may require a separate communications channel between itself and the storage system so that data associated with a plurality of storage tenants is not communicated over the same communications channel. Transmitting data over the same communications channel may enable a first storage tenant to access the data that is being transmitted by a second storage tenant over the same communications channel. Other solutions may fulfill this requirement by having corresponding communication components (hardware and/or software) installed at the datacenter for each of the plurality of storage tenants to enable communications between the datacenter and the storage system. However, the storage tenant and/or datacenter provider may have security concerns about installing a plurality of third party communication components on the datacenter's computing systems because it may be difficult to control the extent to which a communication component accesses, manipulates, and/or exports tenant data.

An entity associated with the storage system also needs to maintain the plurality of communication components that are installed at the datacenter. This may require a tremendous amount of time and resources. For example, the datacenter computing resources may be periodically updated. This may cause the plurality of communication components to experience communication problems between the datacenter and the storage system because the entity associated with the storage system may be unaware of such updates. The entity associated with the storage cluster system may spend time and resources to generate software patches that ensure that the communication components do not experience problems communicating with the storage cluster system.

BRIEF DESCRIPTION OF THE DRAWINGS

Various embodiments of the invention are disclosed in the following detailed description and the accompanying drawings.

FIG. 3 is a flow chart illustrating a process for secure communications of storage tenants that share a storage cluster system in accordance with some embodiments.

DETAILED DESCRIPTION

Figure 1:
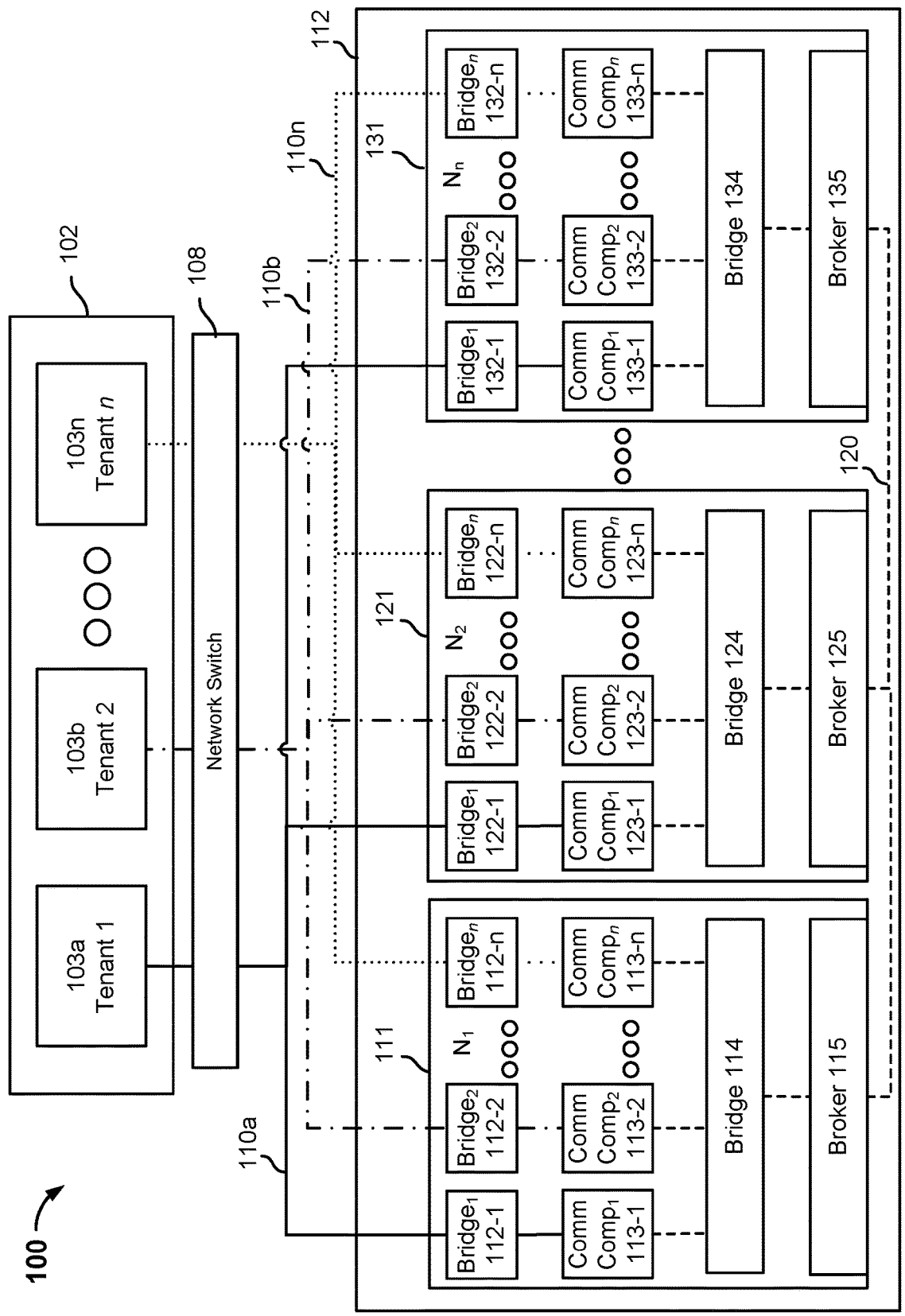
FIG. 1 is a block diagram illustrating a system for providing secure communications between a datacenter and a storage cluster system in accordance with some embodiments.

A technique to provide secure communications between a datacenter and a storage cluster system that reduces the need for additional hardware or software components to be installed at the datacenter is disclosed. A storage cluster system includes a plurality of storage nodes. Instead of installing a corresponding communication component at the datacenter for each of the tenants, the technique includes the storage cluster system hosting a corresponding set of one or more tenant communication components for each of the plurality of storage tenants. This may reduce the security concerns of a storage tenant or a datacenter provider because the datacenter provider is able to control the degree to which a tenant communication component is able to access tenant data. In addition to reducing security concerns that a storage tenant or service provider may have with communications between the datacenter and the storage cluster system, the technique disclosed herein may reduce the time and resources needed to maintain communications between the datacenter and the storage cluster system because an entity associated with the storage cluster system is aware of when the storage cluster system is to be updated and can prepare for potential communication errors.

The storage cluster system is comprised of a plurality of storage nodes. The storage cluster may provide services, such as backup services, disaster recovery services, test and development services, etc. to tenants of a datacenter. The datacenter may host one or more tenant resources (also referred to as a "system component" herein) for a storage tenant. A tenant resource may be a virtual machine, a database, an application, a container, etc. A storage node of the plurality of storage nodes may host one or more of the tenant communication components for a storage tenant that is included in the set of one or more tenant communication components for the storage tenant. In response to receiving one or more data packets from a tenant resource, a tenant communication component is configured to terminate the connection between itself and the tenant resource that sent the one or more data packets. Subsequently, the tenant communication component is configured to originate a new connection between itself and a storage node of the storage cluster system. Traffic to the new connection may be carefully brokered to ensure security and tenant isolation. The tenant communication components associated with a tenant enables secure and bidirectional communication between the tenant resources associated with a tenant and the storage cluster system through the use of a private virtual network.

A corresponding virtual network, such as a VLAN (Virtual Local Area Network), virtual extensible LAN (VXLAN), generic routing encapsulation (GRE), is established for each of the storage tenants. A virtual network associated with a storage tenant allows each of the tenant resources associated with a storage tenant to communicate with a set of one or more tenant communication components associated with the storage tenant hosted by the storage cluster system. For example, a datacenter may host one or more virtual machines for a first storage tenant and one or more virtual machines for a second storage tenant. The one or more virtual machines associated with the first storage tenant have corresponding IP address and the one or more virtual machines associated with the second storage tenant have corresponding IP addresses. An IP address associated with at least one of the one or more first storage tenant virtual machines may overlap with an IP address associated with at least one of the one or more second storage tenant virtual machines.

The storage cluster system may host a first set of one or more tenant communication components for the first storage tenant and a second set of one or more tenant communication components for the second storage tenant. A first virtual network may be established between the one or more virtual machines associated with the first storage tenant and the first set of one or more tenant communication components associated with the first storage tenant. A second virtual network may be established between the one or more virtual machines associated with the second storage tenant and the second set of one or more communication components associated with the second storage tenant. The first virtual network and second virtual network are separate from each other, that is, the first and second virtual networks are isolated from each other (e.g., transport level separation, logical level separation, layer-2 isolated, layer-3 isolated, isolated according to 802.1q standard). In the event one or more tenant resources associated with the first storage tenant and one or more tenant resources associated with the second storage tenant are concurrently sending data to the storage cluster system, the data associated with the first storage tenant and the data associated with the second storage tenant do not collide (i.e., the data associated with the first storage tenant's virtual machine(s) is isolated from the data associated with the second storage tenant's virtual machine(s)) even though it is possible that the data associated with the first and second storage tenants are sent from virtual machines having the same IP address.

A third virtual network is established between the plurality of tenant communication components and components of the storage cluster system. The third virtual network is separate from the virtual networks between storage tenants and their corresponding tenant communication components, that is, the third virtual network is isolated from the first and second virtual networks (e.g., layer-2 isolated, layer-3 isolated). The third virtual network allows the plurality of storage nodes of the storage cluster system to securely communicate with each other.

Hosting a tenant communication component on the storage cluster system may ensure secure communications between a storage tenant and the storage cluster system. A dedicated virtual network is established between the tenant resources associated with a storage tenant and the one or more tenant communication components associated with the storage tenant hosted on the storage cluster system. This enables the IP addresses for tenant resources associated with a first storage tenant to overlap with the IP addresses for tenant resources associated with a second storage tenant. The dedicated virtual network for each storage tenant prevents the data from a plurality of storage tenants from accidentally colliding with each other. A storage tenant of the datacenter may configure a tenant resource to have a particular IP address and be unaware of the IP addresses used by other storage tenants for their tenant resources. It is inconvenient for a storage tenant to reconfigure its tenant resource to have a different IP address because a tenant resource associated with a different tenant is already using the particular IP address. Using a dedicated virtual network for a storage tenant provides the storage tenant with flexibility to configure their tenant resources with IP addresses of their choosing without having to worry that a particular IP address is already being used by a tenant resource associated with a different tenant.

Hosting a tenant communication component on the storage cluster system also may ensure secure communications between the plurality of storage nodes of the storage cluster system. A dedicated virtual network is established between the plurality of tenant communication components and the plurality of storage nodes. An entity external to a storage node must first bypass one of the tenant communication components before the external entity is able to access any of the storage nodes of the storage cluster system. A broker associated with a tenant communication component may use a set of rules to prevent a storage tenant from accessing the data associated with a different storage tenant that is stored on a storage node. On the storage system side, the dedicated virtual network between the plurality of tenant communication components and the plurality of storage nodes may allow the plurality of storage nodes to freely communicate and may prevent an outside entity from intentionally or unintentionally accessing data that is transmitted between the plurality of storage nodes.

FIG. 1 is a block diagram illustrating a system for providing secure communications between a datacenter and a storage cluster in accordance with some embodiments. In the example shown, system 100 includes datacenter 102, network switch 108, and storage cluster system 112. In some embodiments, storage cluster system 112 and network switch 108 are located in datacenter 102. In some embodiments, storage cluster system 112, network switch 108, and datacenter 102 are located in a same network (e.g., local area network, storage area network, etc.).

Datacenter 102 is comprised of a plurality of computing devices (e.g., servers) that provide computing resources for a plurality of storage tenants. The plurality of storage tenants may include a first storage tenant 103a, a second storage tenant 103b, . . . , and an nth storage tenant 103n. A storage tenant may correspond to a user, an individual, an enterprise, a government, a company, an organization, a department within an organization, etc. A storage tenant may nut one or more tenant resources (e.g., virtual machines, applications, containers, etc.) on one or more of the computing devices using computing resources that are provisioned to the storage tenant. A client device (not shown) may communicate with a tenant resource hosted in datacenter 102. The client device may be a computer, desktop, laptop, server, tablet, smartphone, mobile phone, etc.

Each of the one or more tenant resources is associated with a corresponding IP address. The IP protocol used for communications within system 100 may be IPv4, IPv6, or a hybrid of IPv4 and IPv6. In some embodiments, a tenant resource is associated with a plurality of IP addresses. The IP addresses of the one or more tenant resources associated with a first storage tenant may overlap with the IP addresses of the one or more tenant resources associated with a second storage tenant. This is different from other systems that require non-overlapping IP addresses between the one or more tenant resources associated with a first storage tenant and the one or more tenant resources associated with a second storage tenant. A storage tenant of datacenter 102 may configure a tenant resource to have a particular IP address and be unaware of the IP addresses used by other storage tenants for their tenant resources. It is inconvenient for storage tenant 103a to reconfigure its tenant resource to have a different IP address because a tenant resource associated with storage tenant 103b is already using the particular IP address. Using a virtual network 110a for storage tenant 103a provides storage tenant 103a with flexibility to configure their tenant resources with IP addresses of their choosing without having to worry that a particular IP address is already being used by a tenant resource associated with a different tenant, such as storage tenants 103b, . . . , 103n.

A tenant resource is permitted to communicate with one or more tenant communication components associated with the storage tenant. The number of tenant communication components associated with a storage tenant may be manually or automatically scaled up or down. In some embodiments, the number of tenant communication components with a storage tenant is dynamically scaled or down. In some embodiments, the scaling is based on the backup demands of the storage tenant, restore demands of the storage tenant, the load associated with communicating data for the storage tenant, etc. For example, a storage tenant may backup a large amount of data (e.g., 1 TB) to storage cluster system 112. Instead of using a single tenant communication component to communicate the backup data from datacenter 102 to storage cluster system 112, a plurality of tenant communication components may be used. This may prevent a tenant communication component from becoming a bottleneck in the backup process.

In the example shown, storage tenant 103a is associated with a first set of tenant communication components 113-1, 123-1, . . . , 133-1. Storage tenant 103a communicates with the first set of tenant communication components 113-1, 123-1, . . . , 133-1 via virtual network 110a. Storage tenant 103b is associated with a second set of tenant communication components 113-2, 123-2, . . . , 133-2. Storage tenant 103b communicates with the second set of tenant communication components 113-2, 123-2, . . . , 133-2 via virtual network 110b. Storage tenant 103n is associated with an nth set of tenant communication components 113-n, 123-n, . . . , 133-n. Storage tenant 103n communicates with the nth set of tenant communication components 113-n, 123-n, . . . , 133-n via virtual network 110n.

A domain name system (DNS) server (not shown) of datacenter 102 stores a data structure that indicates the one or more tenant communication components with which a tenant resource is permitted to communicate. The data structure may associate a storage tenant with a domain name associated with storage cluster system 112 and virtual internet protocol (VIP) addresses associated with the one or more tenant communication components with which a tenant resource is permitted to communicate. In response to a request to send one or more data packets from a tenant resource to a domain name associated with storage cluster system 112, the DNS server is configured to resolve the domain name associated with storage cluster system 112 to one of the VIP addresses associated with the one or more tenant communication components with which a tenant resource is permitted to communicate. The DNS server may inspect the data structure and select a VIP address. The DNS server may use a round-robin algorithm or different selection algorithm in the event there are a plurality of VIP addresses associated with the one or more tenant communication components with which a tenant resource is permitted to communicate. In some embodiments, the storage tenant is associated with one tenant communication component. In some embodiments, the storage tenant is associated with a plurality of tenant communication components. Associating a storage tenant with a plurality of tenant communication components increases a throughput at which data is communicated to/from a tenant resource to storage cluster system 112.

A tenant resource is configured to provide one or more data packets to network switch 108. In some embodiments, the tenant resource includes in a header associated with the one or more data packets a tag that indicates a virtual network from which the one or more data packets were provided. Network switch 108 may be a top-of-rack switch or other type of switch. Network switch 108 is configured to store a media access control (MAC) address table that associates an IP address (e.g., a VIP address associated with a tenant communication component) with a MAC address associated with a tenant communication component and an output port of network switch 108. The MAC address associated with the tenant communication component may be a physical MAC address or a virtual MAC address. Network switch 108 may use the MAC address table to identify, based on the VIP address selected by the DNS server, the MAC address associated with a tenant communication component and an output port of network switch 108. Network switch 108 is configured to send the one or more data packets to the tenant communication component having the MAC address identified by network switch 108 using the identified port and the virtual network associated with a storage tenant. In some embodiments, network switch 108 is configured to include in a header associated with the one or more data packets a tag that indicates a virtual network from which the one or more data packets were provided. In the event network switch 108 is unable to identify the MAC address associated with a tenant communication component, that is, the VIP address selected by the DNS is not included in the MAC address table, network switch 108 is configured to send the one or more data packets to each of the tenant-facing bridge components associated with a storage tenant from which the one or more data packets are received. For example, network switch 108 may receive one or more data packets from storage tenant 103a and determine that a MAC address associated with the one or more data packets does not exist in a MAC address table stored by network switch 108. In response to such a determination, network switch 108 may forward the one or more data packets to tenant-facing bridge components 112-1, 122-1, 132-1.

The one or more data packets may be received at storage cluster system 112. Storage cluster system 112 includes a plurality of storage nodes 111, 121, 131. Although three storage nodes are depicted in FIG. 1, storage cluster system 112 may include n storage nodes. A storage node may be a physical storage node or a logical storage node. Each storage node may be associated with one or more solid state drives, one or more hard disk drives, or a combination thereof. Each storage node may have its own corresponding processor.

A storage tenant is connected to a tenant communication component via a network bridge. Storage cluster system 112 includes a corresponding set of one or more tenant-facing bridge components for each of the storage tenants 103a, 103b, 103n that are distributed across the storage nodes 111, 121, 131. Each of the storage nodes 111, 121, 131 has zero or more tenant-facing bridge components per storage tenant. In the example shown, each of the storage nodes 111, 121, 131 has one tenant-facing bridge component per storage tenant. Storage node 111 includes a first tenant-facing bridge component 112-1 for tenant 1, a first tenant-facing bridge component 112-2 for tenant 2, . . . , and a first tenant-facing bridge component 112-n for tenant n. Storage node 121 includes a second tenant-facing bridge component 122-1 for tenant 1, a second tenant-facing bridge component 122-2 for tenant 2, . . . , and a second tenant-facing bridge component 122-n for tenant n. Storage node 131 includes an nth tenant-facing bridge component 132-1 for tenant 1, an nth tenant-facing bridge component 132-2 for tenant 2, . . . , and an nth tenant-facing bridge component 132-n for tenant n.

The one or more data packets may be received by a storage node hosting a tenant communication component having the MAC address. The one or more data packets include an identifier of a virtual network with which it is associated (e.g., a tag). The one or more data packets are provided to the tenant-facing bridge component that is associated with the virtual network associated with the identifier. In the example shown, the tenant-facing bridge components associated with tenant 1 (e.g., 112-1, 122-1, . . . , 132-1) are associated with virtual network 110a, the tenant-facing bridge components associated with tenant 2 (e.g., 112-2, 122-2, . . . , 132-2) are associated with virtual network 110b, . . . , and the tenant-facing bridge components associated with tenant n (e.g., 112-n, 122-n, . . . , 132-n) are associated with virtual network 110n.

A tenant-facing bridge component includes a forwarding database table that associates a MAC address with a tenant communication component. The forwarding database table is specific to the storage node on which the tenant-facing bridge component resides. The tenant-facing bridge component is configured to inspect the one or more data packets to determine a destination MAC address and forward the one or more data packets to the tenant communication component having the determined MAC address. In the event the one or more data packets are associated with a destination MAC address that is not included in the forwarding database table, the tenant-facing bridge component is configured to broadcast the one or more data packets to the one or more tenant communication components that are hosted on the same storage node as the tenant-facing bridge component.

A tenant communication component includes a first virtual network interface card (VNIC) that is an interface between a virtual network associated with a tenant, such as virtual network 110a, and the tenant communication component, such as tenant communication component 113-1. The tenant communication component has a tenant-facing VIP address for the virtual network associated with the storage tenant. In the event a destination IP address associated with the one or more data packets is different from the tenant-facing VIP address, the tenant communication component is configured to drop the one or more data packets. In some embodiments, the tenant communication component includes a plurality of VNICs that are interfaces between virtual networks associated with the tenant and the tenant communication component. In this scenario, the tenant communication component has corresponding tenant-facing VIP addresses for each of the virtual networks associated with the storage tenant. The tenant communication component includes a second VNIC that is an interface between the tenant communication component, such as tenant communication component 113-1 and the virtual network for the storage nodes of the storage cluster system, such as virtual network 120. The tenant communication component has a storage cluster-facing IP address for virtual network that is associated with the storage nodes of the storage cluster system.

In the example shown, storage node 111 includes a first storage tenant communication component 113-1 for tenant 1, a first storage tenant communication component 113-2 for tenant 2, . . . , and a first storage tenant communication component 113-n for tenant n. Storage node 121 includes a second storage tenant communication component 123-1 for tenant 1, a second storage tenant communication component 123-2 for tenant 2, . . . , and a second storage tenant communication component 123-n for tenant n. Storage node 132 includes an nth tenant communication component 133-1 for tenant 1, an nth tenant communication component 133-2 for tenant 2, . . . , and an nth tenant communication component 133-n for tenant n.

In response to receiving one or more data packets, a tenant communication component is configured to terminate the connection between itself and the tenant resource that sent the one or more data packets. Subsequently, the tenant communication component is configured to originate a new connection between itself and a broker of the storage node. For example, a new connection may established between tenant communication components 113-1, 113-2, . . . , 113-n and broker 115, between tenant communication components 123-1, 123-2, . . . , 123-n and broker 125, or between tenant communication components 133-1, 133-2, . . . , 133-n and broker 135. The tenant communication component may specify its storage cluster-facing IP address as the source IP address for the one or more data packets and an IP address associated with a broker as the destination IP address for the one or more data packets. The IP address associated with the broker may be auto assigned to the broker when the broker is configured.

A tenant communication component is connected to a broker via a bridge. In some embodiment embodiments, a tenant communication component communicates with a local broker (e.g., a broker on the same storage node as the tenant communication component). In the example shown, tenant communication components 113-1, 113-2, . . . , 113-n are connected to broker 115 via storage cluster-facing bridge 114, tenant communication components 123-1, 123-2, . . . , 123-n are connected to broker 125 via storage cluster-facing bridge 124, and tenant communication components 133-1, 133-2, . . . , 133-n are connected to broker 135 via storage cluster-facing bridge 134. In some embodiments, a tenant communication component communicates with a non-local broker. For example, tenant communication component 113-1 may communicate with brokers 125, 135. Although FIG. 1 depicts each tenant-facing bridge component with a corresponding communications component on the same storage node, in some embodiments, a tenant-facing bridge component is hosted on a storage node without a corresponding tenant communications component, such as tenant-facing bridge component 222-2 of FIG. 2.

A tenant communication component may send the one or more data packets to the broker using the new connection. A storage cluster-facing bridge component, such as storage cluster-facing bridge components 114, 124, 134 is configured to intercept the one or more data packets and inspect the one or more data packets for a MAC address associated with a destination. The storage cluster-facing bridge component includes a forwarding database table. The forwarding database table associates a MAC address with a storage node of storage cluster system 112. In the event the one or more data packets are associated with a MAC address that is included the forwarding database table, the storage cluster-facing bridge component is configured to pass the one or more data packets to a broker via virtual network 120. In the event the one or more data packets are not associated with a MAC address that is included in the forwarding database table, in some embodiments, the storage cluster-facing bridge component is configured to drop the one or more data packets.

A broker, such as brokers 115, 125, 135, is configured to receive the one or more data packets from a storage cluster-facing bridge component. The broker may inspect the one or more data packets, determine a destination within storage cluster system 112 for the one or more data packets, and forwards the one or more data packets to the determined destination. A destination may include a filesystem manager, a storage controller, etc. The one or more data packets may be provided via a remote procedural call.

A broker may receive from the destination a response communication for the tenant resource that sent a communication. The response communication includes one or more data packets. The broker may inspect the one or more data packets to determine a tenant ID. The broker may inspect a data structure that associates a tenant ID with one or more tenant communication components and a VIP address associated with each of the one or more tenant communication components. The broker is configured to select one of the one or more tenant communication components associated with the tenant ID and provides the one or more data packets to the selected tenant communication component. A source IP address associated with the response communication may be a VIP address associated with the broker and a destination IP address associated with the response communication may be the storage cluster-facing IP address associated with the selected tenant communication component.

A storage cluster-facing bridge component, such as storage cluster-facing bridge components 114, 124, 134, is configured to intercept the one or more data packets and inspect the one or more data packets for a MAC address associated with a tenant communication component. The storage cluster-facing bridge component includes a forwarding database table that associates MAC addresses with corresponding tenant communication components. In the event the one or more data packets are associated with a MAC address that is included the forwarding database table, the storage cluster-facing bridge component is configured to pass the one or more data packets to the tenant communication component having the MAC address via virtual network 120. In the event the one or more data packets are not associated with a MAC address that is included in the forwarding database table, the storage cluster-facing bridge component is configured to drop the one or more data packets. The storage cluster-facing bridge component is configured to forward the one or more data packets to a tenant communication component having the MAC address.

In response to receiving one or more data packets, the tenant communication component is configured to terminate the connection between itself and the broker that sent the one or more data packets. Subsequently, the tenant communication component is configured to originate a new connection between itself and the destination tenant resource. The new connection indicates the tenant-facing VIP address of the tenant communication component as a source IP address and the IP address of the tenant resource as a destination IP address. The tenant communication component is configured to add to the one or more data packets a tag that indicates a virtual network to which the one or more data packets are associated. The tenant communication component is configured to provide the one or more data packets to a tenant-facing bridge component for the storage tenant that is associated with the destination tenant resource.

The tenant-facing bridge component for the storage tenant that is associated with the destination tenant resource includes a forwarding database table. The forwarding database table associates a MAC address with a tenant resource. The tenant-facing bridge component is configured to inspect the one or more data packets to determine a destination MAC address and forward the one or more data packets to the tenant resource having the determined MAC address. In the event the one or more data packets are associated with a destination MAC address that is not included in the forwarding database table, the tenant-facing bridge component is configured to drop the one or more data packets.

The tenant-facing bridge component may provide the one or more data packets to network switch 108. In some embodiments, network switch 108 provides the one or more data packets to a tenant resource having the destination IP address and a network port associated with the tenant resource. Network switch 108 stores a MAC address table that associates an IP address (e.g., an IP address associated with a tenant resource) with a MAC address associated with a tenant resource and an output port. The MAC address associated with the tenant resource may be a physical MAC address or a virtual MAC address. In some embodiments, network switch 108 uses the MAC address table to identify, based on the destination IP address indicated by the one or more data packets, the MAC address associated with a tenant resource and an output port of network switch 108. Network switch 108 is configured to send the one or more data packets to the tenant resource having the MAC address identified by network switch 108 using the identified port and the virtual network associated with a storage tenant. Network switch 108 determines the virtual network associated with the storage tenant based on the tag included in the one or more data packets that indicates a virtual network to which the one or more data packets are associated. The tenant resource is configured to receive the one or more data packets and send one or more response packets using the framework described above.

Figure 2A:
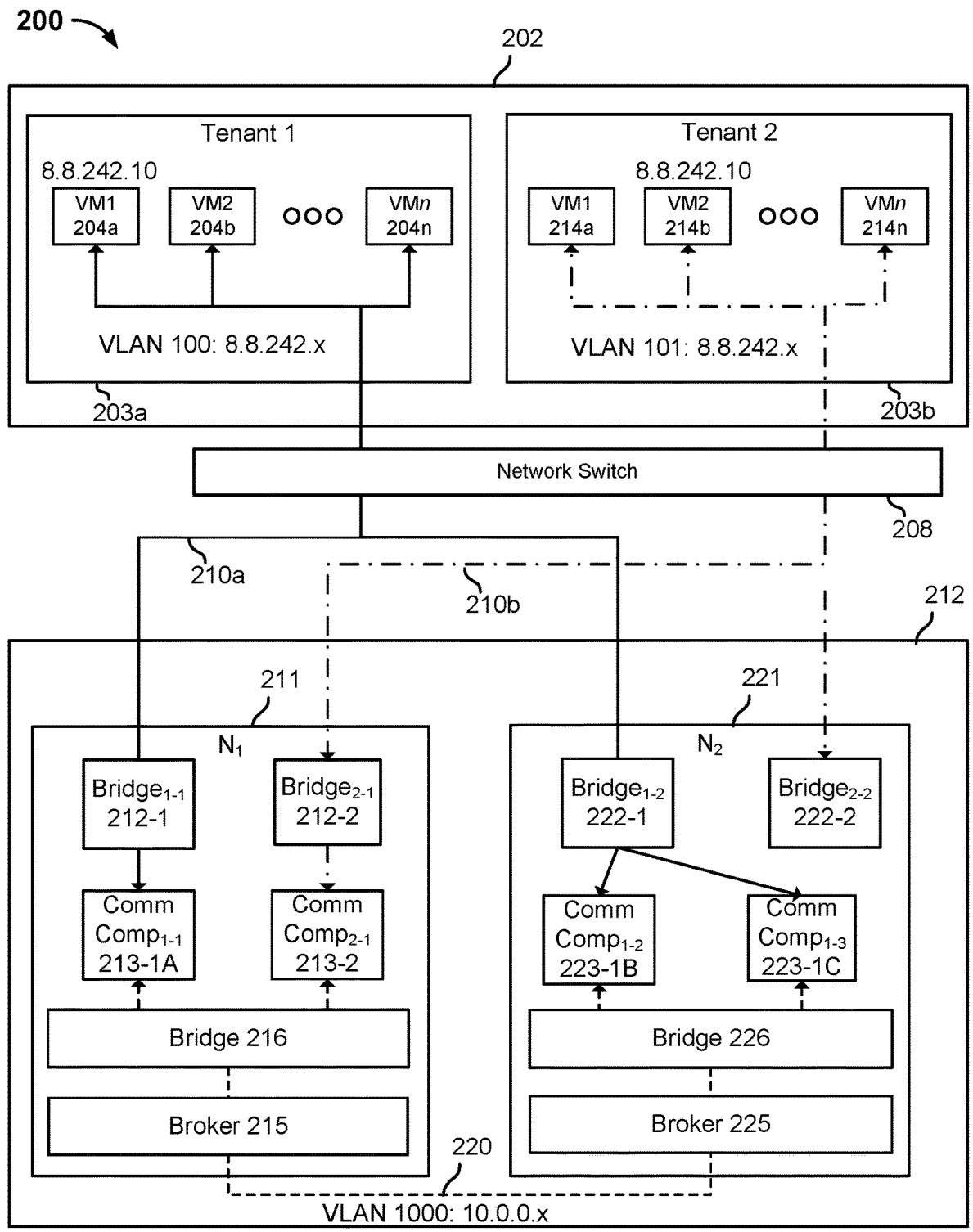
FIG. 2A is a block diagram illustrating examples of secure communications between a datacenter and a storage cluster system in accordance with some embodiments.

FIG. 2A is a block diagram illustrating examples of secure communications between a datacenter and a storage cluster system in accordance with some embodiments.

In the example shown, a first storage tenant 203a includes a plurality of virtual machines 204a, 204b, . . . , 204n and a second storage tenant 203b includes a plurality of virtual machines 214a, 214b, . . . , 214n. VM 204a has an IP address of 8.8.242.10. VM 214b also has an IP address of 8.8.242.10. The first storage tenant 203a is associated with a first virtual network 210a and the second storage tenant 203b is associated with a second virtual network 210b. IP addresses associated with tenant 1 and tenant 2 may be overlapping, but their data packets do not collide because each tenant is associated with a separate virtual network, that is, the separate virtual networks are isolated from each other (e.g., layer-2 isolated, layer-3 isolated).

VM 204a may receive a request to communicate with a domain associated with storage cluster system 212. A DNS server (not shown) of datacenter 202 resolves the domain associated with storage cluster system 212 to a VIP address associated with one of the tenant communication components 213-1A, 223-1B, 223-1C. The DNS server of datacenter 202 selects one of the VIP addresses and one or more data packets are sent from VM 204A to the selected tenant communication component. In this example, the DNS server selects tenant communication component 223-1B as a destination for the one or more data packets. A header of the one or more data packets may indicate the IP address associated with VM 204a as the source IP address and a VIP address associated with tenant communication component 223-1B as the destination IP address. The header of the one or more data packets may also indicate a virtual network on which the one or more data packets were transmitted (e.g., virtual network 210a). The one or more data packets are provided from VM 204A to network switch 208 via virtual network 210a.

Network switch 208 stores a MAC address table that associates an IP address with a MAC address associated with a tenant communication component and an output port of network switch 208. Network switch 208 uses the MAC address table to identify, based on the VIP address of tenant communication component 223-1B, the MAC address associated with tenant communication component 223-1B and an output port of network switch 208. Network switch 208 sends the one or more data packets to tenant communication component 223-1B having the MAC address identified by network switch 208 using the identified port and virtual network 210a. In the event network switch 208 is unable to identify the MAC address associated with a tenant communication component, that is, the VIP address selected by the DNS is not included in the MAC address table, network switch 208 is configured to send the one or more data packets to each of the tenant-facing bridge components associated with a storage tenant from which the one or more data packets are received. For example, network switch 208 may receive one or more data packets from VM 204 associated with storage tenant 203a and determine that a MAC address associated with the one or more data packets does not exist in a MAC address table stored by network switch 208. In response to such a determination, network switch 208 may forward the one or more data packets to tenant-facing bridge components 212-1, 222-1.

The one or more data packets are received at storage node 221. The one or more data packets include an identifier of a virtual network 210a. The one or more data packets are inspected and provided to tenant-facing bridge component 222-1 because that is the tenant-facing bridge component on storage node 221 that is associated with virtual network 210a. Tenant-facing bridge component 222-1 includes a forwarding database table that associates a MAC address with a tenant communication component. Tenant-facing bridge component 222-1 inspects the one or more data packets to determine a destination MAC address and forwards the one or more data packets to the tenant communication component having the determined MAC address. In the event the one or more data packets are associated with a destination MAC address that is not included in the forwarding database table, tenant-facing bridge component 222-1 is configured to broadcast the one or more data packets to the one or more tenant communication components that are hosted on the same storage node as the tenant-facing bridge component. In this example, tenant-facing bridge component 222-1 determines that tenant communication component 223-1B has the determined MAC address and the one or more data packets are forwarded to tenant communication component 223-1B.

Tenant communication component 223-1B includes a first VNIC that is an interface between a virtual network 210a and itself. Tenant communication component 223-1B has a tenant-facing VIP address for virtual network 210a. In the event a destination IP address associated with the one or more data packets is different from the tenant-facing VIP address associated with tenant communication component 223-1B, tenant communication component 223-1B is configured to drop the one or more data packets. In this example, the tenant-facing VIP address is 8.8.242.101. Tenant communication component 223-1B includes a second VNIC that is an interface between itself and virtual network 220. Tenant communication component 223-1B has a storage cluster-facing IP address for virtual network 220. In this example, the storage cluster-facing IP address is 10.0.1.3.

In response to receiving one or more data packets, tenant communication component 223-1B terminates the connection between VM 204a and itself. Subsequently, tenant communication component 223-1B originates a new connection between itself and broker 225. A header of the one or more data packets may indicate the VIP address associated with tenant communication component 223-1B as the source IP address and an IP address associated with broker 225 as the destination IP address.

Tenant communication component 223-1B sends the one or more data packets to broker 225 using the new connection. Storage cluster-facing bridge component 226 intercepts the one or more data packets and inspects the one or more data packets for a MAC address associated with a destination. Storage cluster-facing bridge component 226 includes a forwarding database table. The forwarding database table associates a MAC address with a storage node of storage cluster system 212. In the event the one or more data packets are associated with a MAC address that is included the forwarding database table, storage cluster-facing bridge component 226 passes the one or more data packets to broker 225 via virtual network 220. In the event the one or more data packets are not associated with a MAC address that is included in the forwarding database table, storage cluster-facing bridge component 226 drops the one or more data packets.

Broker 225 receives the one or more data packets from storage cluster-facing bridge component 226 and inspects the one or more data packets to determine a destination within storage cluster system 212 for the one or more data packets and forwards the one or more data packets to the determined destination. A destination may include a filesystem manager, a storage controller, etc.

In another example, VM 214b may receive a request to communicate with a domain associated with storage cluster system 212. The DNS server (not shown) of datacenter 202 resolves the domain associated with storage cluster system 212 to a VIP address associated with tenant communication component 213-2. In this example, tenant 2 is associated with a single tenant communication component. The DNS server of datacenter 202 resolves the domain associated with storage cluster system 212 to the VIP address associated with tenant communication component 213-2. In this example, tenant communication component 213-2 has an IP address of 8.8.242.100. A header of the one or more data packets may indicate the VIP address associated with VM 214b as the source IP address and an VIP address associated with tenant communication component 213-2 as the destination IP address. The header of the one or more data packets may also indicate a virtual network on which the one or more data packets were transmitted (e.g., virtual network

210b). The one or more data packets are provided from VM 214b to network switch 208 via virtual network 210b.

Network switch 208 stores a MAC address table that associates an IP address with a MAC address associated with a tenant communication component and an output port of network switch 208. Network switch 208 uses the MAC address table to identify, based on the VIP address of tenant communication component 213-2, the MAC address associated with tenant communication component 213-2 and an output port of network switch 208. Network switch 208 sends the one or more data packets to tenant communication component 213-2 having the MAC address identified by network switch 208 using the identified port and virtual network 210b. In the event network switch 208 is unable to identify the MAC address associated with a tenant communication component, that is, the VIP address selected by the DNS is not included in the MAC address table, network switch 208 is configured to send the one or more data packets to each of the tenant-facing bridge components associated with a storage tenant from which the one or more data packets are received. For example, network switch 208 may receive one or more data packets from VM 214b associated with storage tenant 203b and determine that a MAC address associated with the one or more data packets does not exist in a MAC address table stored by network switch 208. In response to such a determination, network switch 208 may forward the one or more data packets to tenant-facing bridge components 212-2, 222-2.

The one or more data packets are received at storage node 211. The one or more data packets include an identifier of a virtual network 210b. The one or more data packets are inspected and provided to tenant-facing bridge component 212-2 because that is the tenant-facing bridge component on storage node 211 that is associated with virtual network 210b. Tenant-facing bridge component 212-2 includes a forwarding database table that associates a MAC address with a tenant communication component. Tenant-facing bridge component 212-2 inspects the one or more data packets to determine a destination MAC address and forwards the one or more data packets to the tenant communication component having the determined MAC address. In this example, tenant-facing bridge component 212-2 determines that tenant communication component 213-2 has the determined MAC address and the one or more data packets are forwarded to tenant communication component 213-2.

Tenant communication component 213-2 includes a first VNIC that is an interface between a virtual network 210b and itself. Tenant communication component 213-2 has a tenant-facing VIP address for virtual network 210b. In this example, the tenant-facing VIP address is 8.8.242.100. Tenant communication component 213-2 includes a second VNIC that is an interface between itself and virtual network 220. Tenant communication component 213-2 has a storage cluster-facing IP address for virtual network 220. In this example, the storage cluster-facing IP address is 10.0.1.2.

In response to receiving one or more data packets, tenant communication component 213-2 terminates the connection between VM 214b and itself. Subsequently, tenant communication component 213-2 originates a new connection between itself and broker 215. A header of the one or more data packets may indicate the storage cluster-facing IP address associated with tenant communication component 213-2 as the source IP address and an IP address associated with broker 215 as the destination IP address.

Tenant communication component 213-2 sends the one or more data packets to broker 215 using the new connection. Storage cluster-facing bridge component 216 intercepts the one or more data packets and inspects the one or more data packets for a MAC address associated with a destination. Storage cluster-facing bridge component 216 includes a forwarding database table. The forwarding database table associates a MAC address with a storage node of storage cluster system 212. In the event the one or more data packets are associated with a MAC address that is included the forwarding database table, storage cluster-facing bridge component 216 passes the one or more data packets to broker 215 via virtual network 220. In the event the one or more data packets are not associated with a MAC address that is included in the forwarding database table, bridge component 216 drops the one or more data packets.

Broker 215 receives the one or more data packets from storage cluster-facing bridge component 216 and inspects the one or more data packets to determine a destination within storage cluster system 212 for the one or more data packets and forwards the one or more data packets to the determined destination. A destination may include a filesystem manager, a storage controller, etc.

In another example, broker 225 receive from a destination a response communication for a VM 204a. The response communication includes one or more data packets. Broker 225 may inspect the one or more data packets to determine a tenant ID (e.g., "Tenant 1"). Broker 225 may inspect a data structure that associates a tenant ID with one or more tenant communication components and a VIP address associated with each of the one or more tenant communication components. The data structure may indicate that "Tenant 1" is associated with tenant communication components 213-1A, 223-1B, and 223-1C. Broker 225 selects one of the one or more tenant communication components associated with the tenant ID and provides the one or more data packets to the selected tenant communication component. In this example, broker 225 has selected tenant communication component 223-1B.

Storage cluster-facing bridge component 226 intercepts the one or more data packets and inspects the one or more data packets for a MAC address associated with a tenant communication component. Storage cluster-facing bridge component 226 includes a forwarding database table that associates MAC addresses with corresponding tenant communication components. In the event the one or more data packets are associated with a MAC address of tenant communication component 223-1B, storage cluster-facing bridge component 226 passes the one or more data packets to tenant communication component 223-1B via virtual network 120.

In response to receiving one or more data packets, tenant communication component 223-1B terminates the connection between itself and broker 225. Subsequently, tenant communication component 2232-1B originates a new connection between itself and the VM 204a. The new connection indicates the tenant-facing VIP address of tenant communication component 223-1B as a source IP address and the IP address of VM 204a as a destination IP address. Tenant communication component 223-1B adds a tag to the one or more data packets that indicates a virtual network to which the one or more data packets are associated (e.g., virtual network 210a). Tenant communication component 223-1B provides the one or more data packets to tenant-facing bridge component 222-1.

Tenant-facing bridge component 222-1 includes a forwarding database table that associates an IP address associated with a virtual machine of Tenant 1 with a MAC address associated with the virtual machine of Tenant 1. Tenant-facing bridge component 222-1 inspects the one or more data packets to determine a destination MAC address and forwards the one or more data packets to the virtual machine having the determined MAC address. In this example, tenant-facing bridge component 222-1 determines a MAC address for VM 204a.

Tenant-facing bridge component 222-1 provides the one or more data packets to network switch 208. In some embodiments, network switch 208 provides the one or more data packets to a tenant resource having the destination IP address and a network port associated with the tenant resource. Network switch 208 stores a MAC address table that associates an IP address of a tenant virtual machine with a MAC address associated with the virtual machine and an output port. In some embodiments, network switch 208 uses the MAC address table to identify, based on the destination IP address indicated by the one or more data packets, the MAC address associated with the virtual machine and an output port of network switch 208. Network switch 208 sends the one or more data packets to the virtual machine having the MAC address identified by network switch 208 using the identified port and virtual network 210a.

Figure 2B:
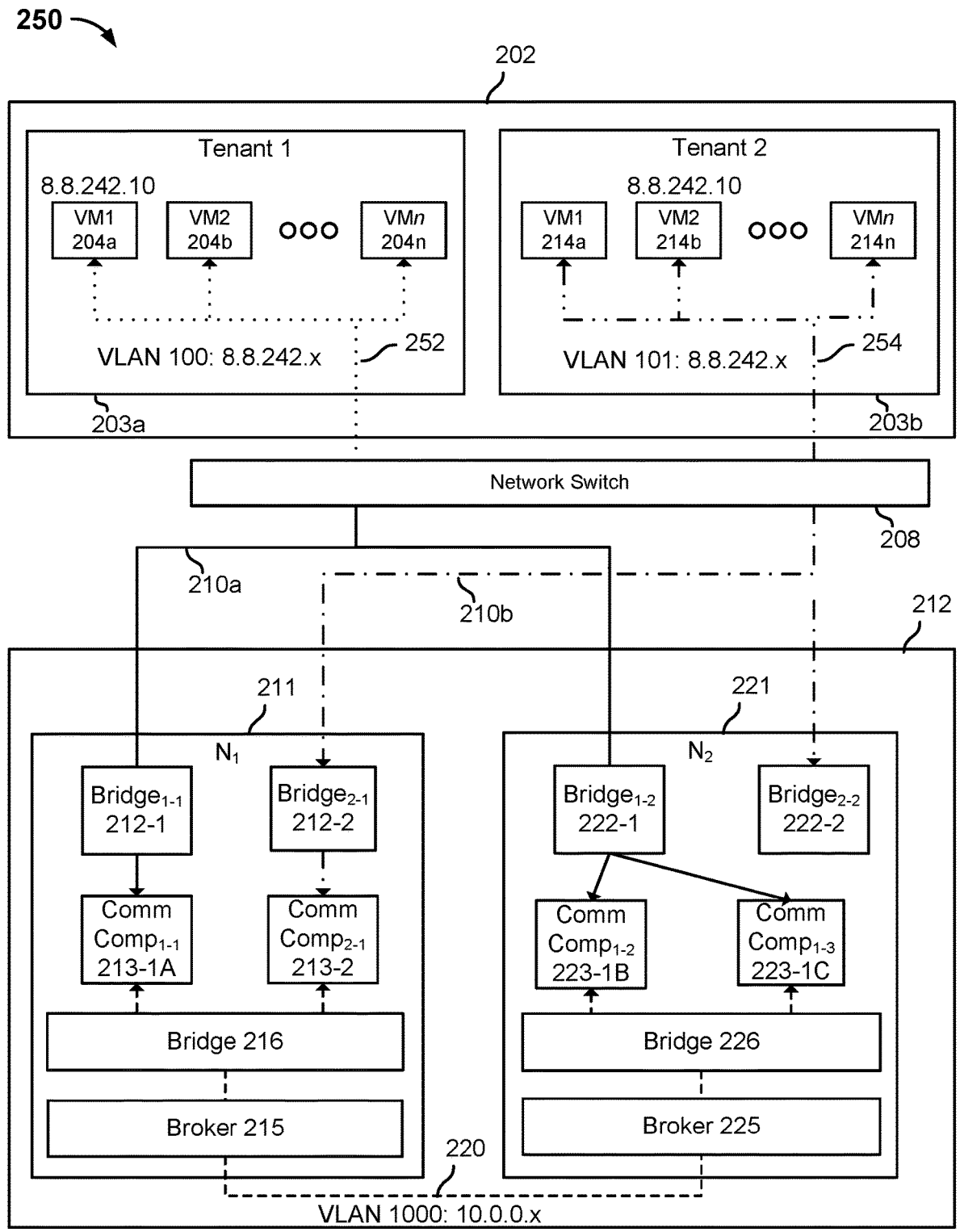
FIG. 2B is a block diagram illustrating examples of secure communications between a datacenter and a storage cluster system in accordance with some embodiments.

FIG. 2B is a block diagram illustrating examples of secure communications between a datacenter and a storage cluster system in accordance with some embodiments. System 250 is similar to system 200 except that the header of the one or more data packets transmitted by VM 204a and the header of the one or more data packets transmitted by VM 214b do not indicate a virtual network on which the one or more data packets were transmitted.

The virtual machines associated with tenant 1, such as VM 204a, may send the one or more data packets to network switch 208 via virtual network 252. The virtual machines associated with tenant 2, such as VM 214b, may send the one or more data packets to network switch 208 via virtual network 254. In this example, network switch 208 is configured to include in a header associated with the one or more data packets a tag that indicates a virtual network on which the one or more data packets were transmitted.

FIG. 3 is a flow chart illustrating a process for secure communications of storage tenants that share a storage cluster system in accordance with some embodiments. In the example shown, process 300 may be implemented by a storage cluster system, such as storage cluster system 112.

The storage cluster system is comprised of a plurality of storage nodes. A storage node of the plurality of storage nodes may host one or more of the tenant communication components for a tenant that is included in the set of one or more tenant communication components for the tenant. The datacenter may host one or more tenant resources (also referred to as a "system component" herein) for a tenant. A tenant resource may be a virtual machine, a database, an application, a container, etc. A tenant communication component associated with a storage tenant enables the tenant resource(s) associated with the storage tenant to securely inter-communicate with the storage cluster system through the use of a private virtual network for the storage tenant.

At 302, a first set of one or more tenant communication components are used to communicate with a first separate system component of a first storage tenant via a first virtual network. A datacenter may host one or more system components for a first storage tenant. A system component for the first storage tenant may be a virtual machine, a database, an application, a container, etc. A tenant communication component associated with the first storage tenant enables the separate system component(s) associated with the first storage tenant to securely communicate with the storage cluster system and vice versa through the use of a virtual network for the first storage tenant.

At 304, a second set of one or more tenant communication components are used to communicate with a second separate system component of a second storage tenant via a second virtual network. The datacenter may host one or more system components for a second storage tenant. A system component for a second storage tenant may be a virtual machine, a database, an application, a container, etc. A tenant communication component associated with the second storage tenant enables the separate system component(s) associated with the second storage tenant to securely communicate with the storage cluster system and vice versa through the use of a virtual network for the second storage tenant.

Figure 4A:
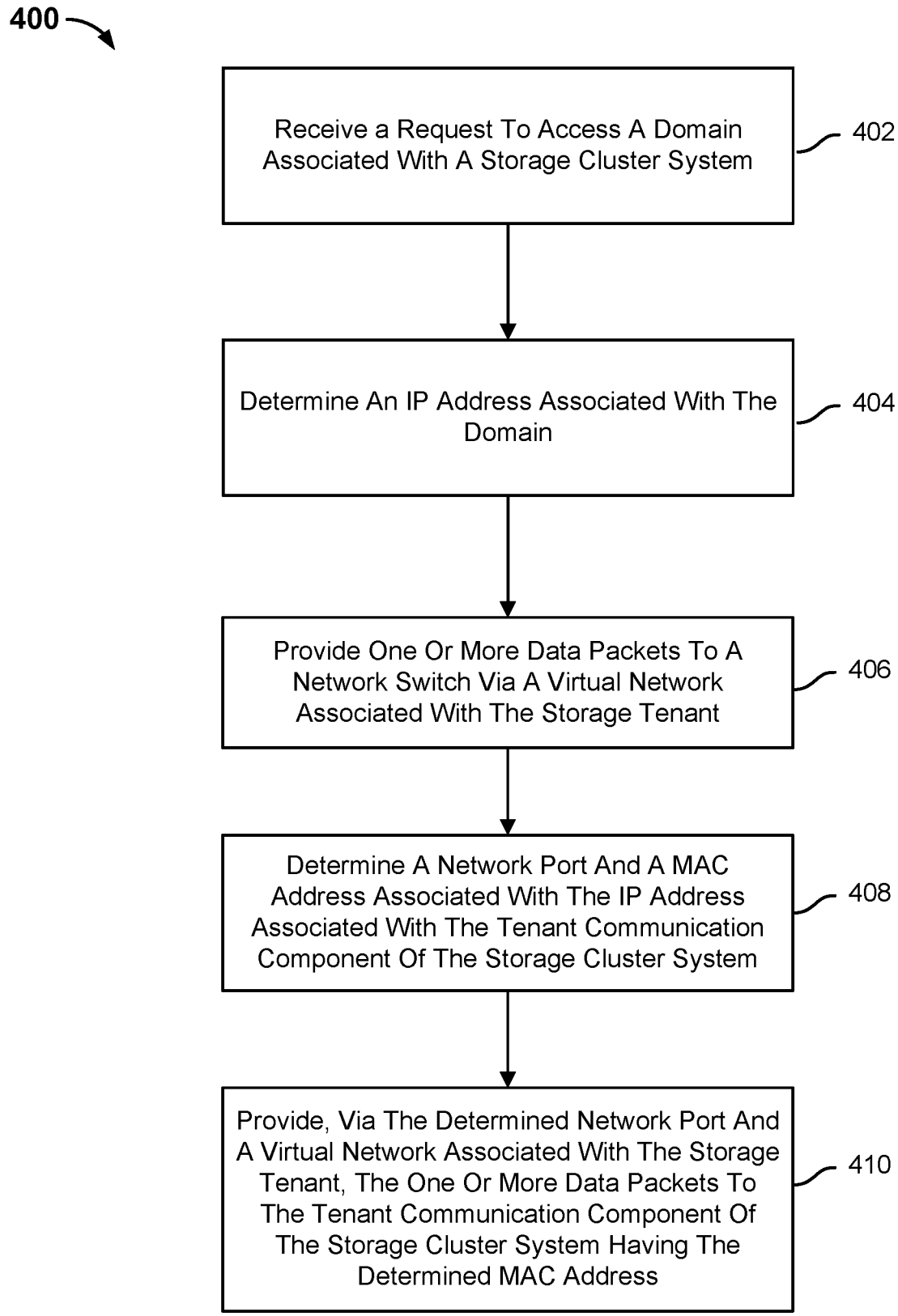
FIG. 4A is a flow chart illustrating a process for communicating data packets from a datacenter to a storage cluster system in accordance with some embodiments.

FIG. 4A is a flow chart illustrating a process for communicating data packets from a datacenter to a storage cluster system in accordance with some embodiments. In the example shown, portions of process 400 may be implemented by a datacenter, such as datacenters 102, 202 and portions of process 400 may be implemented by a network switch, such as network switch 108, 208.

At 402, a request to access a domain associated with a storage cluster system is received at a tenant resource associated with a storage tenant. A datacenter may provide resources for a plurality of storage tenants. Each of the storage tenants is associated with one or more tenant resources.

A user associated with a tenant resource may request to access a domain associated with the storage cluster system. The domain associated with the storage cluster system may enable the user associated with the tenant resource to back up data associated with the tenant resource to the storage cluster system, to manage data associated with the tenant resource stored at the storage cluster system, to restore data associated with the tenant resource from the storage cluster system to the tenant resource, to replicate data associated with the tenant resource from the storage cluster system to another tenant resource associated with the storage tenant, to migrate data associated with the tenant resource from the storage cluster system to a cloud archive, etc.

At 404, an IP address associated with the domain is determined. A DNS server associated with the datacenter stores a data structure that associates a storage tenant with one or more tenant communication components of the storage cluster system. The data structure indicates corresponding VIP addresses of the one or more tenant communication components of the storage cluster system that are associated with the storage tenant. The IP address may be a physical IP address or a VIP address. The data structure may associate each of the plurality of storage tenants with their corresponding one or more tenant communication components of the storage system. In the event a single VIP address is associated with the domain the DNS server selects the single VIP address. In the event one or more VIP addresses are associated with the domain the DNS serve selects one of the VIP addresses using a round-robin algorithm or a different selection algorithm.

At 406, one or more data packets associated with the request are provided to a network switch via a virtual network associated with the storage tenant. The datacenter includes a network switch that may be a top-of-rack switch or other type of network switch. The network switch a MAC address table that associates a VIP address associated with a tenant communication component with a MAC address associated with the tenant communication component and an output port of the network switch. The MAC address table stores the information for each of the tenant communication components associated with each of the storage tenants of the datacenter.

At 408, a network port and a MAC address associated with a tenant communication component of a storage cluster system are determined. The network switch uses the MAC address table to determine, based on the determined IP address, the MAC address associated with the tenant communication component and the output port of the network switch to use when sending the one or more data packets to the tenant communication component.

At 410, the one or more data packets are provided, via the network port and the virtual network associated with the storage tenant, to the tenant communication component of the storage cluster system having the determined MAC address.

In the event the network switch is unable to identify the MAC address associated with a tenant communication component, that is, the VIP address selected by the DNS is not included in the MAC address table, the network switch is configured to send the one or more data packets to each of the tenant-facing bridge components associated with a storage tenant from which the one or more data packets are received.

Figure 4B:
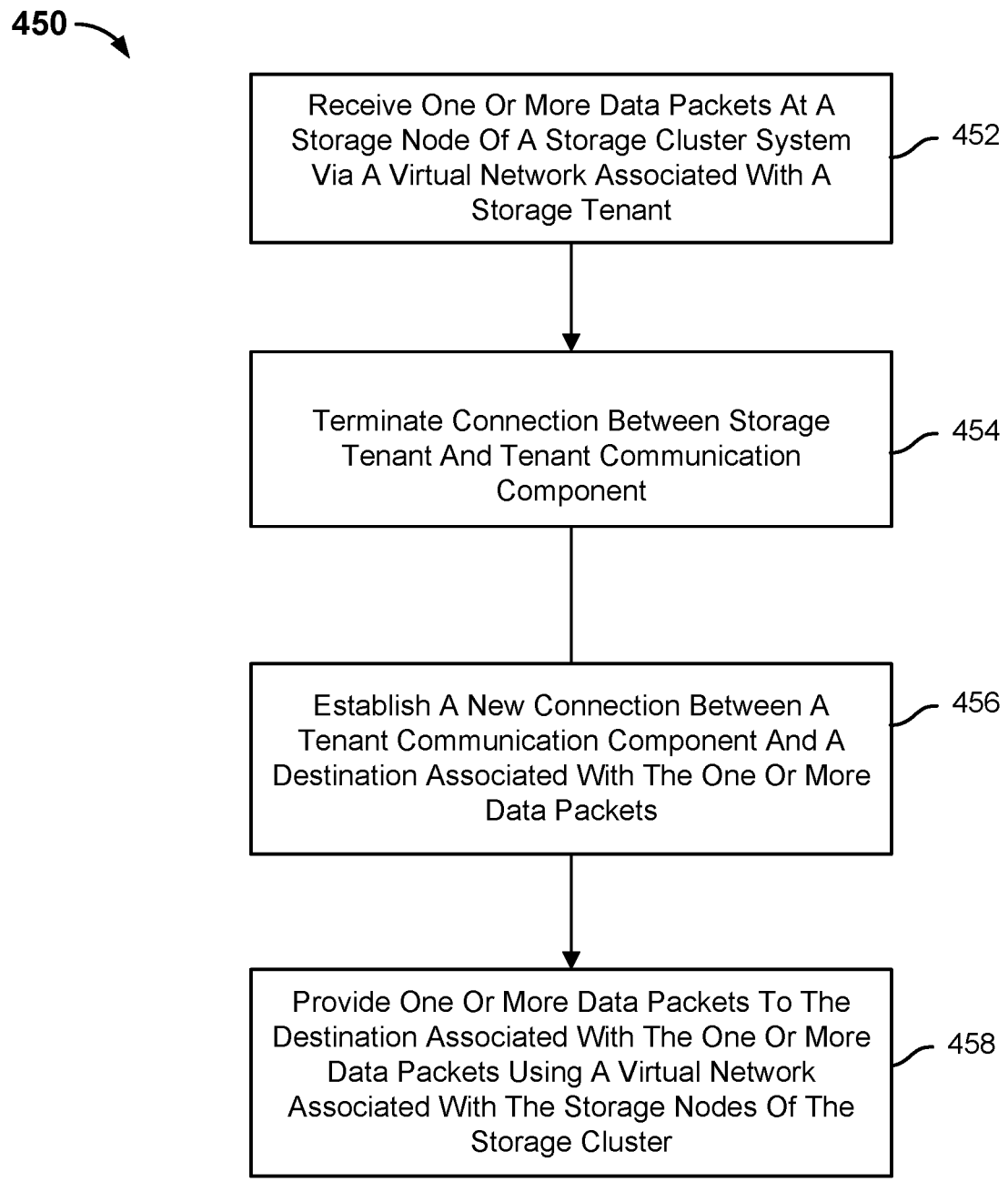
FIG. 4B is a flow chart illustrating a process for communicating data packets from a datacenter to a storage cluster system in accordance with some embodiments.

FIG. 4B is a flow chart illustrating a process for communicating data packets from a datacenter to a storage cluster system in accordance with some embodiments. In the example shown, process 450 may be implemented by a storage cluster system, such as storage cluster system 112.

At 452, one or more data packets are received at a storage node of a storage cluster system via a virtual network associated with a storage tenant. A network switch of a data center provided the one or more data packets via the network associated with the storage tenant to a storage node of a storage cluster system hosting a tenant communication component having a MAC address associated with the one or more data packets.

The storage node includes a plurality of tenant-facing bridge components, each of the tenant-facing bridge components associated with one of the storage tenants of the datacenter. The one or more data packets are provided to a tenant-facing bridge component that corresponds to the virtual network associated with the storage tenant. The tenant-facing bridge component includes a forwarding database table that associates a MAC address with a tenant communication component. The tenant-facing bridge component inspects the one or more data packets to determine a MAC address associated with the one or more data packets and provides the one or more data packets to the tenant communication component having the determined MAC address.

At 454, a connection between a storage tenant and a tenant communication component is terminated. The tenant communication component includes a first VNIC that is an interface between a virtual network associated with the storage tenant and itself. The first VNIC has a tenant-facing VIP address for the virtual network associated with the storage tenant.

At 456, a new connection between the tenant communication component and a destination associated with the one or more data packets is established. The tenant communication component includes a second VNIC that is an interface between itself and a virtual network for the storage nodes of the storage cluster system. The second VNIC has a storage cluster-facing IP address for the virtual network associated with the storage nodes of the storage cluster system. A source IP address associated with the one or more data packets is the storage cluster-facing IP address of the tenant communication component and a destination IP address associated with the one or more data packets is an IP address associated with a destination of the storage cluster system.

At 458, the one or more data packets are provided to the destination associated with the one or more data packets using the virtual network associated with the storage nodes of the storage cluster system. In route to the destination, a storage cluster-facing bridge component intercepts the one or more data packets and inspects the one or more data packets for a MAC address associated with a destination. The storage cluster-facing bridge component includes a forwarding database table. The forwarding database table associates a MAC address with a storage node of storage cluster system 112. In the event the one or more data packets are associated with a MAC address that is included the forwarding database table, the storage cluster-facing bridge component passes the one or more data packets to a broker via the virtual network associated with the storage nodes of the storage cluster system. In the event the one or more data packets are not associated with a MAC address that is included in the forwarding database table, the storage cluster-facing bridge component drops the one or more data packets.

A broker receives the one or more data packets from a storage cluster-facing bridge component, inspects the one or more data packets, determines a destination within the storage cluster system for the one or more data packets, and forwards the one or more data packets to the determined destination. A destination may include a filesystem manager, a storage controller, etc.

Figure 5A:
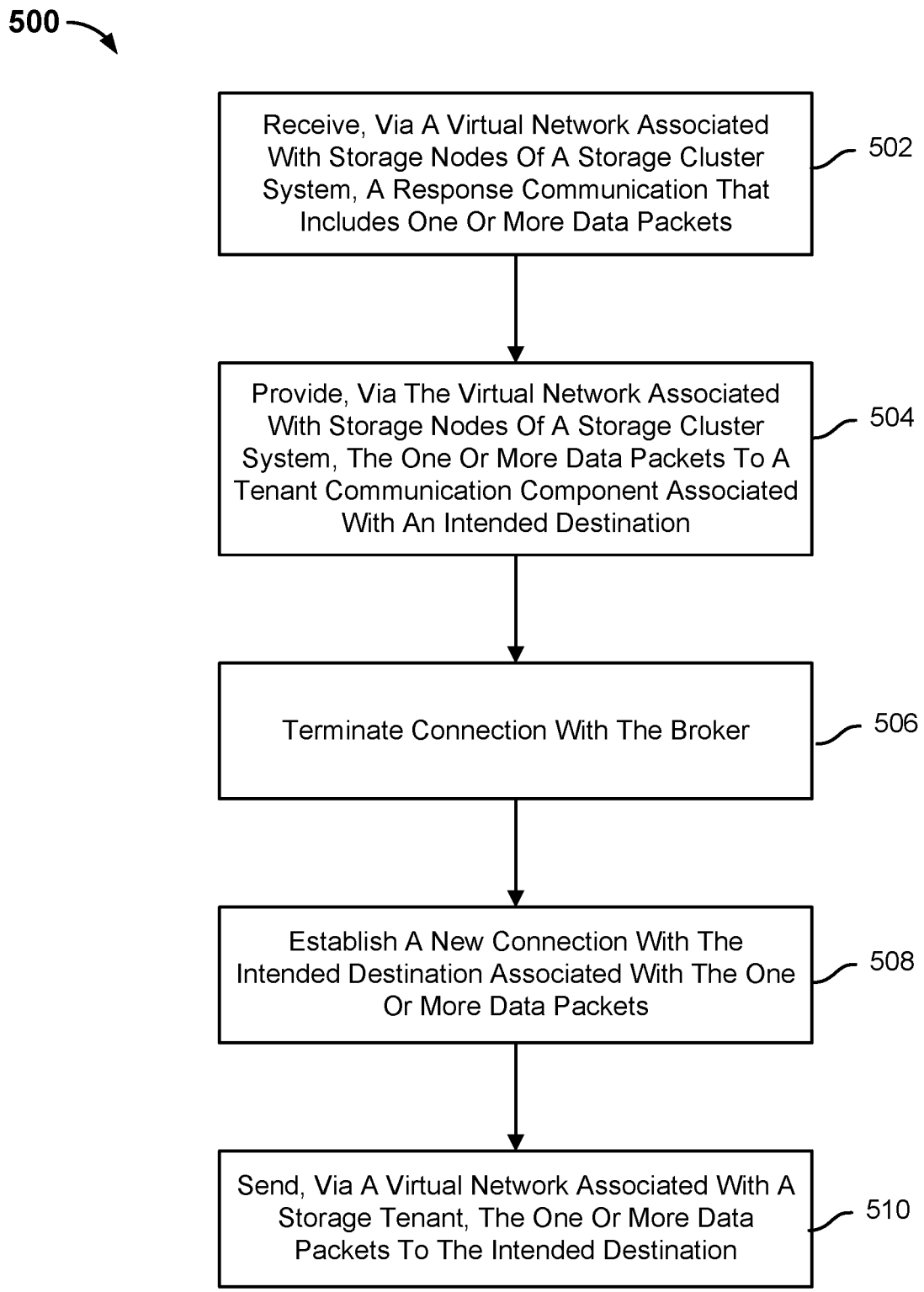
FIG. 5A is a flow chart illustrating a process for communicating data packets from a storage cluster system to a datacenter in accordance with some embodiments.

FIG. 5A is a flow chart illustrating a process for communicating data packets from a storage cluster system to a datacenter in accordance with some embodiments. In the example shown, process 500 may be implemented by a storage cluster system, such as storage cluster system 112.

At 502, a response communication that includes one or more data packets is received via a virtual network associated with the storage nodes of the storage cluster system. A broker of storage node may receive a response communication for a tenant resource associated with a storage tenant. The broker may inspect the one or more data packets to determine a tenant ID. The broker may inspect a data structure that associates a tenant ID with one or more tenant communication components and a VIP address associated with each of the one or more tenant communication components. The broker selects one of the one or more tenant communication components associated with the tenant ID and provides the one or more data packets to the selected tenant communication component using a virtual network associated with the storage nodes of the cluster system.

At 504, the one or more data packets are provided to a tenant communication component associated with an intended destination via the virtual network associated with the storage nodes of the storage cluster system. A storage cluster-facing bridge component intercepts the one or more data packets and inspects the one or more data packets for a MAC address associated with a tenant communication component. The storage cluster-facing bridge component includes a forwarding database table that associates MAC addresses with corresponding tenant communication components. In the event the one or more data packets are associated with a MAC address that is included the forwarding database table, the storage cluster-facing bridge component passes the one or more data packets to the tenant communication component having the MAC address via the virtual network associated with the storage nodes of the cluster system. In the event the one or more data packets are not associated with a MAC address that is included in the forwarding database table, the storage cluster-facing bridge component drops the one or more data packets.

At 506, a connection is terminated between a tenant communication component and a broker. At 508, a new connection is established between the intended destination and the tenant communication component. The new connection indicates the tenant-facing VIP address of the tenant communication component as a source IP address and the VIP address of the tenant resource as a destination IP address. The tenant communication component adds a tag to the one or more data packets that indicates a virtual network to which the one or more data packets are associated. The tenant communication component provides the one or more data packets to a bridge component associated with the destination tenant resource.

At 510, the one or more data packets are sent to the intended destination via a virtual network associated with a storage tenant. The tenant-facing bridge component associated with the destination tenant resource includes a forwarding database table. The forwarding database table associates a MAC address with a tenant resource. The tenant-facing bridge component inspects the one or more data packets to determine a destination MAC address and forwards the one or more data packets to the tenant resource having the determined MAC address. In the event the one or more data packets are associated with a destination MAC address that is not included in the forwarding database table, the tenant-facing bridge component drops the one or more data packets.

Figure 5B:
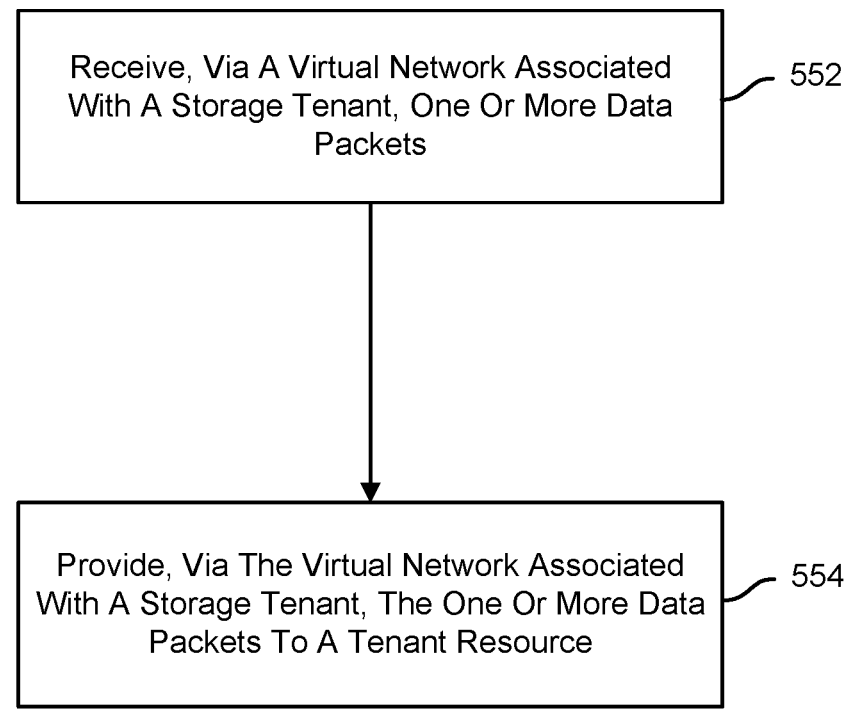
FIG. 5B is a flow chart illustrating a process for communicating data packets from a storage cluster system to a data center in accordance with some embodiments.

FIG. 5B is a flow chart illustrating a process for communicating data packets from a storage cluster system to a data center in accordance with some embodiments. In the example shown, process 550 may be implemented by a network switch, such as network switch 108, 208.

At 552, one or more data packets are received at a network switch of the datacenter via a virtual network associated with a storage tenant. The network switch stores a MAC address table that associates an IP address with a MAC address associated with a tenant resource and an output port.

At 554, the one or more data packets are provided, via the virtual network associated with the storage tenant, to a tenant resource. In some embodiments, the network switch provides the one or more data packets to a tenant resource having the destination IP address. In some embodiments, the network switch uses a MAC address table to identify, based on the destination IP address indicated by the one or more data packets, the MAC address associated with a tenant resource and an output port of network switch. The network switch sends the one or more data packets to the tenant resource having the MAC address using the identified port and the virtual network associated with a storage tenant. Subsequently, the tenant resource receives the one or more data packets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, at a broker associated with a storage node of a plurality of storage nodes via a virtual network associated with the plurality of storage nodes of a storage system, a response communication that includes one or more data packets;
    providing, via the virtual network associated with the storage nodes, the one or more data packets to a tenant communication component associated with an intended destination;
    terminating a connection between the broker and the tenant communication component associated with the intended destination;
    establishing a new connection between the intended destination and the tenant communication component associated with the intended destination, wherein the new connection is associated with a virtual network associated with a storage tenant; and
    sending, via the virtual network associated with the storage tenant, the one or more data packets to the intended destination.

2. The method of claim 1, wherein the response communication is for a tenant resource associated with the storage tenant.

3. The method of claim 1, wherein the broker inspects the one or more data packets to determine a tenant identifier.

4. The method of claim 3, wherein the broker inspects a data structure that associates the tenant identifier with at least one of a group of one or more tenant communication components and a virtual internet protocol address associated with at least one of the group of one or more tenant communication components.

5. The method of claim 4, wherein the broker selects the tenant communication component associated with the intended destination from the group of one or more tenant communication components based on the tenant identifier.

6. The method of claim 1, wherein a storage-facing bridge component intercepts the one or more data packets and inspects the one or more data packets for a media access control (MAC) address associated with the tenant communication component associated with the intended destination.

7. The method of claim 6, wherein the storage-facing bridge component includes a forwarding database table.

8. The method of claim 7, wherein the storage-facing bridge component is configured to forward the one or more data packets to the tenant communication component in response to a determination that the MAC address associated with the tenant communication component is included in the forwarding database table.

9. The method of claim 7, wherein the storage-facing bridge component is configured to drop the one or more data packets to the tenant communication component in response to a determination that the MAC address associated with the tenant communication component is not included in the forwarding database table.

10. The method of claim 1, wherein the new connection indicates a tenant-facing virtual internet protocol address of the tenant communication component is a source internet protocol address and a virtual internet protocol address of a tenant resource associated with the storage tenant is a destination internet protocol address.

11. The method of claim 1, wherein the tenant communication component adds a tag to the one or more data packets that indicates the virtual network associated with the storage tenant to which the one or more data packets are associated.

12. The method of claim 1, wherein a tenant-facing bridge component intercepts the one or more data packets to determine a destination media access control (MAC) address associated with a tenant resource.

13. The method of claim 12, wherein the tenant-facing bridge component includes a forwarding database table.

14. The method of claim 13, wherein the tenant-facing bridge component is configured to forward the one or more data packets in response to a determination that the intended destination has the determined destination MAC address associated with the tenant resource.

15. The method of claim 13, wherein the tenant-facing bridge component is configured to drop the one or more data packets in response to a determination that the intended destination does not have the determined destination MAC address associated with the tenant resource.

16. A computer program product embodied in a non-transitory computer readable medium and comprising computer instructions for:
receiving, at a broker associated with a storage node of a plurality of storage nodes via a virtual network associated with the plurality of storage nodes of a storage system, a response communication that includes one or more data packets;
providing, via the virtual network associated with the storage nodes, the one or more data packets to a tenant communication component associated with an intended destination;
terminating a connection between the broker and the tenant communication component associated with the intended destination;
establishing a new connection between the intended destination and the tenant communication component associated with the intended destination, wherein the new connection is associated with a virtual network associated with a storage tenant; and
sending, via the virtual network associated with the storage tenant, the one or more data packets to the intended destination.

17. The computer program product of claim 16, wherein the broker inspects the one or more data packets to determine a tenant identifier.

18. The computer program product of claim 17, wherein the broker inspects a data structure that associates the tenant identifier with at least one of a group of one or more tenant communication components and a virtual internet protocol address associated with at least one of the group of one or more tenant communication components.

19. The computer program product of claim 18, wherein the broker selects the tenant communication component associated with the intended destination from the group of one or more tenant communication components based on the tenant identifier.

20. A system, comprising:
a processor configured to:
receive, at a broker associated with a storage node of a plurality of storage nodes via a virtual network associated with the plurality of storage nodes of a storage system, a response communication that includes one or more data packets;
provide, via the virtual network associated with the storage nodes, the one or more data packets to a tenant communication component associated with an intended destination;
terminate a connection between the broker and the tenant communication component associated with the intended destination;
establish a new connection between the intended destination and the tenant communication component associated with the intended destination, wherein the new connection is associated with a virtual network associated with a storage tenant; and
send, via the virtual network associated with the storage tenant, the one or more data packets to the intended destination; and
a memory coupled to the processor and configured to provide the processor with instructions.

* * * * *